United States Patent [19]

Bella et al.

[11] 3,857,857

[45] Dec. 31, 1974

[54] STEREOISOMERS OF 1-(1'(-O-CHLOROBENZYL)-2'-PYRRYL)-2-DISEC. BUTYLAMINO-ETHANOL

[75] Inventors: Davide Della Bella, Milan; Carlo Veneziani, Bresso; Dario Chiarino, Monza; Uberto Maria Teotino, Milan, all of Italy

[73] Assignee: Whitefin Holding S.A., Lugano, Switzerland

[22] Filed: Oct. 24, 1972

[21] Appl. No.: 299,726

[30] Foreign Application Priority Data

| Oct. 30, 1971 | Italy | 30587/71 |
| Oct. 30, 1971 | Italy | 30586/71 |
| Oct. 30, 1971 | Italy | 30585/71 |
| Oct. 30, 1971 | Italy | 30588/71 |
| July 4, 1972 | Italy | 26564/72 |

[52] U.S. Cl. ........................ 260/326.5 L, 424/274
[51] Int. Cl. ........................................ C07d 27/26
[58] Field of Search ...................... 260/326.5 L

[56] References Cited
FOREIGN PATENTS OR APPLICATIONS
1,154,744  6/1969  Great Britain............ 260/326.5 L Primary Examiner—Joseph A. Narcavage
Attorney, Agent, or Firm—Stevens, Davis, Miller & Mosher

[57] ABSTRACT

The optically active stereoisomer of 1-[1'-(o-chlorobenzyl-2'pyrryl]-2-disec.butylamino ethanol whose p-hydroxybenzoate has $[\gamma]_D^{16} = 24° \pm 3°$ (c=1% in methanol), essentially free of different optical isomers, useful as an analgetic, and a process for the preparation thereof starting from the optically active mono-sec.butylamine, through preparation of the optically active disec.butylamine, reaction thereof with 1-(o-chlorobenzyl) -2-pyrryl glyoxyl halide, reduction of the latter prepared compound to 1-[1' (o-chlorobenzyl)-2'-pyrryl]-2-disec.butylamino (1R+1S) ethanol which is split into the two optically active isomers by fractional crystallization of the corresponding p-hydroxy-benzoates.

7 Claims, 1 Drawing Figure

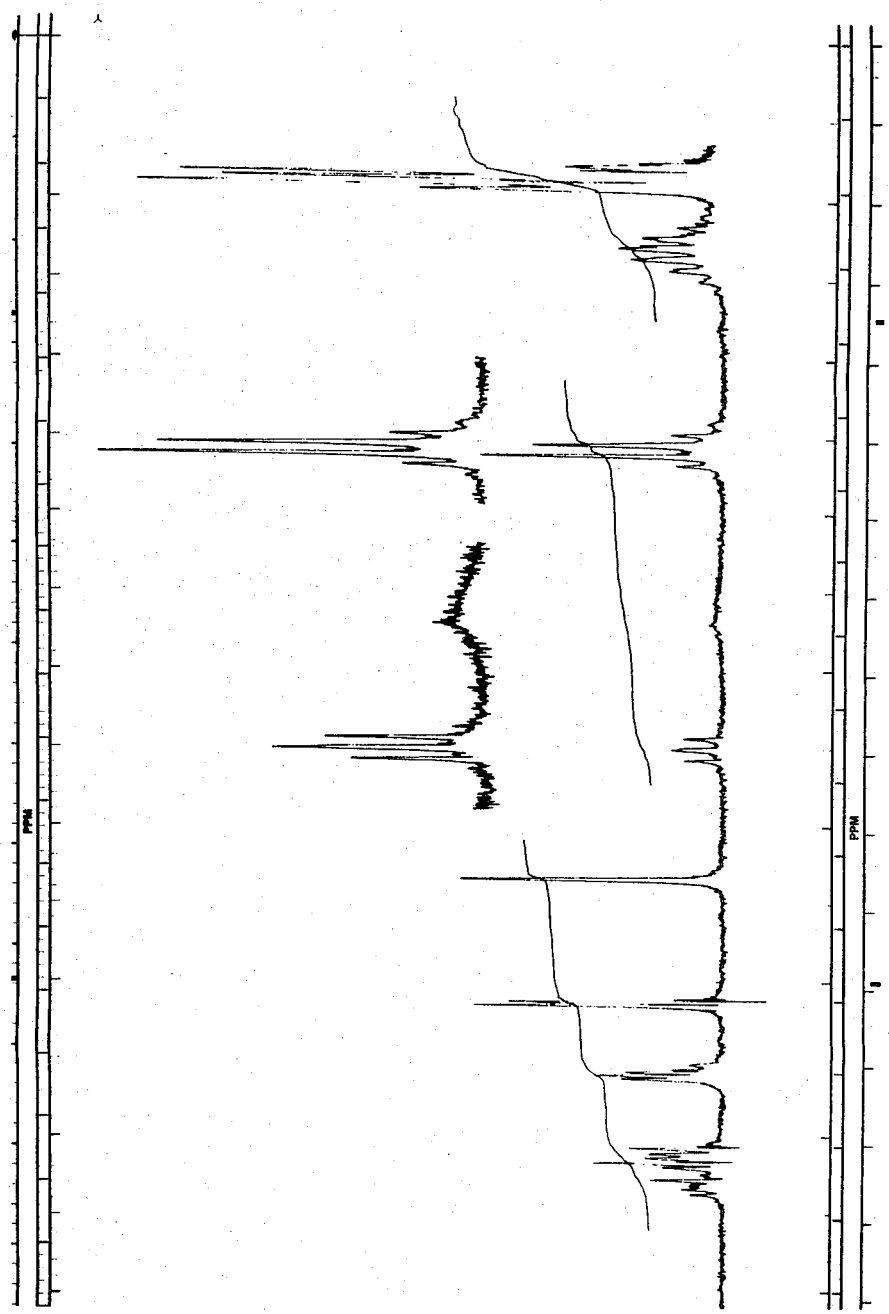

STEREOISOMERS OF 1-(1'(-o-CHLOROBENZYL)-2'-PYRRYL)-2-DISEC. BUTYLAMINO-ETHANOL

The present invention refers to the stereoisomers of 1-[1'-(o-chlorobenzyl)-2'-pyrryl]-2-disec.butylaminoethanol, the salts thereof with physiologically tolerable organic or inorganic acids and the process for their preparation.

The British Pat. No. 1,154,744 describes and claims some pyrrylamino-ethanols active on the CNS.

Among these pyrrylaminoethanols particularly useful analgesic has resulted the 1-[1'-(o-chlorobenzyl)-2'-pyrryl]-2-disec.butylamino ethanol whose proposed International Common Denomination is Viminolo (W.H.O. Chronicle, 1970, No. 3, list 25.)

The viminolo has the following formula

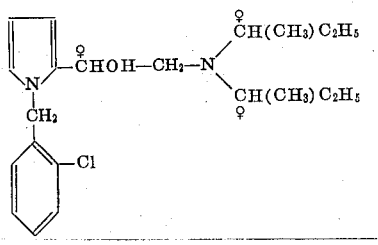

I wherein the carbon atoms indicated with an asterisk are asymmetrical carbon atoms. It is thus evident for a man skilled in the art that six stereoisomers of formula I formed of three pairs of enantiomers, may exist. In order to define the space configuration of the six stereoisomers, the JUPAC Tentative Rules for the Nomenclature of Organic Chemistry 1970, 35, 2,849–2,867 will be followed in the course of the present invention. In so far as, in particular, the absolute configuration of disec.butylamine is concerned, we have based on the absolute configuration of sec.butylamino : A. Kjaer, S. E. Hansen, Acta Chemica Scandinavia 1957,II-1,898

In so far as instead the third center of asymetry is concerned (carbon atom in the 1-position of ethanol), no correlation between the rotatory power of each stereoisomer and its absolute configuration has been found.

Taking into consideration the great therapeutical insterest of Viminolo and the well known fact that the various stereoisomers constituting a racemic mixture have different activity, the applicant has engaged himself with the task of finding out a method for the resolution of Viminolo. Anyway, all the attempts made to this end, by using the usual techniques of resolution of racemates, have given no positive result at all.

The applicant has now solved the problem through another way, by preparing for synthesis the six stereoisomers of 1-[1'-(o-chloro-benzyl)-2'-pyrryl]-2'-disec.butylaminoethanol of formula I; it is this one object of the present invention.

The applicant has also identified each of the six stereoisomers and determined their characteristics of activity and toxicity.

In particular the applicant has quite surprisingly found that the analgetic activity of one of the two stereoisomers of formula 1-[1'-(o-chloro-benzyl)-2'-pyrryl]-2-di-(R,R)-sec.butylamino ethanol is nearly eight times higher than that of Viminolo, while some of the stereoisomers of formula 1-[1'-(o-chloro-benzyl)-2'-pyrryl]-2-di-(S,S)-sec.butylamino-ethanol and of formula 1-[1'(o-chloro benzyl)-2'-pyrryl]-2-di-(S,R)-sec.butylamino ethanol have antagonist activity both in respect to the first named isomer and to morphine.

Thus also the above named new compounds and the therapeutical compositions containing the same, constitute an object of the present invention.

The novel stereoisomers of formula I have been identified through the specific rotatory power of the corresponding p-hydroxybenzoates, as hereinafter specifically set forth:

1. 1-[1'-(o-chloro-benzyl)-2'-pyrryl]-2-di-(S,S)-sec.butylamino-ethanol p-hydroxybenzoate with $[\alpha]_D^{16} = +24° \pm 3°$ (c = 1% in methanol), which in the present specification will be identified as $S_1$ 2. 1-[1'-(o-chloro-benzyl)-2'-pyrryl]-2-di-(S,S)-sec.butylamino-ethanol p-hydroxybenzoate with $[\alpha]_D^{20} = +1° \pm 0.5°$ (c = 4% in methanol), which in the present specification will be identified as $S_2$.

3. 1-[1'-(o-chloro-benzyl)-2'-pyrryl]-2-di-(R,R)-sec.butylamino-ethanol p-hydroxybenzoate with $[\alpha]_D^{20} = -1° \pm 0.5°$(c=4% in methanol), which in the present specification will be identified as $R_1$.

4. 1-[1'-(o-chloro-benzyl)-2'-pyrryl]-2-di-(R,R-sec.butylamino-ethanol p-hydroxybenzoate with specific rotatory power :

$[\alpha]_D^{16} = -24° \pm 3°$ (c=1% in methanol); $-22° \pm 3°$(c=1.5% in methanol $-19° \pm 3°$ (c=4% in methanol)

$[\alpha]_{578}^{16} = -24° \pm 3°$ (c=1% in methanol); $-22° \pm 3°$ (c= 1.5% in methanol; $-19° \pm 3°$ (c= 4% in methanol)

$[\alpha]_{546}^{16} = -29° \pm 3°$ (c= 1% in methanol); $-27° \pm 3°$ (c=1.5% in methanol); $-21° \pm 3°$ (c= 4% in methanol)

$[\alpha]_{436}^{16} = -47° \pm 3°$ (c = 1% in methanol); $-43° \pm 3°$ (c=1.5% in methanol); $-33° \pm 3°$ (c=4% in methanol)

$[\alpha]_{365}^{16} = -61° \pm 3°$ (c=1% in methanol; $-56° + 3°$ (c=1.5% in methanol); $-42° \pm 3°$ (c=4% in methanol)

The NMR spectrum of this compound, which in the course of the present specification will be indicated with $R_2$, is reported in FIG. 1.

The NMR spectrum of FIG. 1 has been obtained with XL 100 VARIAN apparatus, by using as the solvent $CDCl_3$ and tetramethylsilano as internal standard.

5. 1-[1'-(o-chloro-benzyl)-2'-pyrryl]-2-di-(R,S) sec.-butylamino (1R + 1S)-ethanol p-hydroxybenzoate, which in the present specification will be identified with Mr.

The process of preparation of the new stereoisomers according to the present invention comprises essentially the following steps, inventive as a whole and in each single step.

a. the diastereoisomer of the desired disec.-butylamino is prepared by reacting the corresponding optically active monosec.butylamine with a racemic sec.butyl derivative of formula $X-CH(CH_3)C_2H_5$, wherein X is Br, Cl, I, $SO_4$ or $p-CH_3-C_6H_4-SO_3$, and separating the desired optically active disec.butylamine from the R,S-disec.butyalmine by fractional crystallization of the corresponding salts, from a suitable polar solvent;

b. a stereoisomer of disec.butylamine is condensed with 1-(p-chlorobenzyl)-2-pyrryl glyoxyl halide;

c. the N,N-disec.butyl-[1-(o-chlorobenzyl)-2-pyrryl]glyoxylamide is reduced to 1-[1'-(o-chloro-benzyl)-2'-pyrryl]-2-disec.butylamine (1R+1S)ethanol by means of a metal or organometal hydride;

d. the mixture of the two diastereoisomers is salified with p-hydroxybenzoic acid;

e. the p-hydroxybenzoate of one of the two diastereoisomers is separated by fractional crystallization from suitable polar organic solvents f. the remaining p-hydroxybenzoate of the other diastereoisomer is separated from the mother liquor of crystallization of the initial mixture of the two p-hydroxybenzoates.

The step (a) is carried out preferably in the presence of organic polar solvents, at a temperature comprised between 0°C and the boiling point of the reaction mixture. The separation of the isomeric amines is realized by successive fractional crystallizations of the formed salts or of suitable salts, from polar solvents wherein they present a sharply different solubility. Solvents of this kind are for example ethanol and acetone.

The [1-(o-chlorobenzyl)-2-pyrryl]glyoxyl halide needed to carry out the step (b) of the process is prepared by reacting 1-(o-chlorobenzyl)-pyrrole with an oxalyl halide in the presence of an inert solvent.

Preferably the reaction is performed:

at a temperature lower than 0°C by eliminating from the reaction mixture the formed hydrohalogenic acid by means of an acid blocking agent, such as for example pyridine, a trialkylamine, a N,N-dialkylaniline or by means of a stream of inert gas by using the oxalyl halide only in slight excess over the stoichiometric amount by adding slowly the 1-(o-chlorobenzyl)-pyrrole to the oxalyl halide rather than vice versa.

The reaction between the [1-(o-chlorobenzyl)-2-pyrryl]-glyoxyl halide and the suitable stereoisomer of disesc.butylamine or an acid addition salt thereof is carried out in the presence of an inert solvent and of an acid blocking agent such as for example pyridine, a trialkylamine, a N,N-dialkylaniline, an alkaline or earth-alkaline acid carbonate.

The reduction according to step (c) of the process is preferably performed with sodium-bis-(2-methoxy-ethoxy)-aluminum hydride, in the presence of an inert organic solvent, at a temperature comprised between room temperature and the boiling point of the reaction mixture.

From the mixture of diastereoisomers salts, the salt of each diastereoisomer is separated by treatment with polar solvents, such as acetone, isopropanol, ethanol and mixture thereof, taking advantage of the quite different solubility of each salt under critical conditions.

Particularly speaking, by dissolving 1 part by weight of the salts mixture into 6 parts by volume of boiling acetone, cooling at room temperature and filtering, a mixture rich in one of the two diastereoisomers is obtained wherefrom the same diastereisomer is obtained in the pure state by repeatedly crystallizing under the same conditions.

From the mother-liquor of the first crystallization, by cautiously evaporating to dryness, a mixture enriched in the remaining diastereoisomer is obtained. From this mixture the second crystalline diastereoisomer is obtained by repeatedly crystallizing from six parts of pro-panol.

The separation of the diastereoisomer from the mother liquor may also be performed by concentrating said mother liquor up to a ratio solute : solvent equal to 1:6 and cooling at room temperature. The thus separated solid product, rich of the second diastereoisomer is filtered and recrystallized from isopropanol or acetone.

The analgetic activity of each stereoisomer of formula (I) has been evaluated through the tail-flick method, according to the technique of D'Amour and Smith (J.Pharmacol.1941, 72, 74). The $ED_{50}$ values have been calculated basing on the straight line of linear regression.

The $DL_{50}$ values, with the related fiduciary limits at 95% (given in parenthesis) have been calculated with the method of Lichtfield and Wilcoxon (J.Pharmacol.1949,96, 99).

The obtained results are summarized in the following table:

TABLE I

| Compound | $ED_{50}$ rat mg/kg i.p. | $DL_{50}$ mouse mg/kg i.p. |
| --- | --- | --- |
| Viminolo | 12.5 | 167 (140–198) |
| $R_1$ | >20 | 232 (195–276) |
| $R_2$ | 1.3 | 230 (200–264) |
| $S_1$ | >20 | >500 |
| $S_2$ | >20 | 108 (85–122) |
| Mr | >20 | 179 (149–213) |

As it can be seen from the given values, it has been surprisingly found that the compound $R_2$ possesses an analgetic activity about eight times higher than that of Viminolo, while its toxicity is of about 30 percent lower than that of Viminolo. It is thus evident that the compound $R_2$ constitutes, in so far as the analgetic activity is concerned, a great technical progress with respect to Viminolo and has to be considered with respect to it a new, surprising product.

The compound $S_2$, studied with particular reference to its ability to precipitate the withdrawal syndrome, has quite surprisingly resulted endowed with a nalorphine-and naloxone-like activity. As a matter of fact when used for the jumping test according to Saelens, et al., (Committee on Problems of Drug Dependence, 1971, vol.II, Page 1310), it has shown an activity which may be compared both from the qualitative and quantitative point of view with that of nalorphine and naloxone, as it can be seen from the following Table II.

TABLE II

| | Jumping test : results after 2 days | | | |
| --- | --- | --- | --- | --- |
| | Compound administered over 2 days (7 treatments) | | | |
| Jumping induced by: | Morphine n.of jumping mice/n.of treated mice | –400 mg/kg/i.p. average jumps per mouse | $R_2$ (HCl) n.jumping mice/ n.treated mice | –165 mg/kg/i.p. average jumps per mouse |
| $S_1$ (HCl) 50 mg/kg/i.p. | — | — | 0/6 | 0.00 |

TABLE II—Continued

Jumping test : results after 2 days

| | Compound administered over 2 days (7 treatments) | | | |
|---|---|---|---|---|
| Jumping induced by: | Morphine n.of jumping mice/n.of treated mice | −400 mg/kg/i.p. average jumps per mouse | $R_2$ (HCl) n.jumping mice/ n.treated mice | −165 mg/kg/i.p. average jumps per mouse |
| $R_1$ (HCl) 50 mg/kg/i.p. | — | — | 0/5 | 0.00 |
| Meso (racemic) (HCl) 50 mg/kg/i.p. | — | — | 0/5 | 0.00 |
| $S_2$ (HCl) 50 mg/kg/i.p. | 40/57 | 14.33±1.81 | 17/18 | 20.06±3.70 |
| Naxolone (HCl) | 53/54 | 33.41±3.46 | 29/29 | 52.31±7.63 |
| Nalorphine (HBr) 50 mg/kg/i.p. | 10/13 | 8.69+2.92 | 11/12 | 20.64±4.12 |

Besides than with respect to their ability to precipitate the withdrawal syndrome, the stereoisomers have been studied with respect to their ability to eliminate the body dependence when administered chronically together with the active compounds $R_2$ and morphine.

It has thus surprisingly found that both the compound $S_2$ and the compound Mr strongly eliminate the body dependence induced by the active compounds.

In order to more clearly illustrate the process according to the present invention, without however limiting the same, we furnish hereinafter a preparation example of compound $R_2$.

The remaining stereoisomers are prepared in a quite analogous manner.

EXAMPLE

Grams 303 (4.15 M) of R (−) sec.butylamine, obtained starting from racemic sec.butylamine by means of L(+)tartaric acid D(−)tartaric acid (Thomê,-Ber.(1903),36,582) are refluxed in 600 ml of absolute ethanol with 709 g (5.15M) of (R+S)-2-bromo-butane over 60–80 hours. After cooling the reaction mixture is acidified, if necessary, with an ethanolic solution of hydrobromic acid and then warm filtered. The filtrate is cooled in a freezer over 48 hours. By filtering under vacuum 238 g of R,R-(−)-disec.butylamine hydrobromide are obtained, still impure of R,S-disec.butylamine hydrobromide and traces of R-(−)-sec.butylamine hydrobromide; with three successive crystallizations from acetone, 109 g of R,R-(−)-disec.butylamine hydrobromide with an optical purity higher than 95% are obtained; after a further crystallization, the optically quite pure compound is obtained having $[\alpha]_D^{20}=-2.27°$ (c = 6.45% in methanol); M.P.207°–209°C.

Grams 30 of R,R-(−)-disec.butylamine hydrobromide are treated under cooling, with an excess of 50 percent aqueous solution of NaOH. The organic phase is separated, dried on NaOH drops, decanted and distilled on NaOH drops.

Grams 12.4 of amine are thus obtained with Kp (757 tor) = 132° − 133°C and $[\alpha]_D^{20}=-56.98°$.

A solution consisting of 15 g of oxalyl chloride in 130 ml of anhydrous pentane is introduced in a 1 l flask provided with stirrer, thermometer, tube for bubbling in nitrogen and reflux cooler protected with a calcium chloride valve, and then it is cooled at about −10°C. Dry nitrogen is allowed to stream through the flask and a solution consisting of 18.9 g of 1-(o-chlorobenzyl)-pyrrole in 60 ml of pentane is dropped in under stirring, at such a rate to keep the temperature at about −10°C.

After addition is ended, stirring is continued for a further 1½ hour at the same temperature.

At this moment the solvent and the excess oxalyl chloride are displaced by the nitrogen stream, by applying a slight vacuum and gradually raising the temperature up to 40°C.

Both the stream of nitrogen and heating are discontinued and the crystalline yellow precipitate of acid chloride is dissolved in 190 ml of dichloromethane.

This solution is brought again to −10°C and is added, under good stirring, with a solution consisting of 20.75 g of (R,R) (−)-disec.butylamine hydrobromide and 20 g of triethylamine in 180 ml of dichloromethane.

When addition is completed the temperature is gradually raised to about 40°C and stirring is continued still for 1½ hour. After cooling the solution is washed with water, with 5% aqueous solution of HCl, with a saturated solution of sodium acid carbonate and finally again with water.

The organic layer, dried on $MgSO_4$ and filtered is evaporated under vacuum up to dryness (33.8g).

The so obtained product is purified by crystallization from isopropanol/hexane (78% by weight of hexane), decoloration on activated carbon in methanol, filtration, evaporation of methanol and recrystallization of the residue from the above named mixture isopropanol-hexane. The compound (−)N,N-di(R,R)sec.butyl[1-(o-chlorobenzyl)-2-pyrryl]-glyoxylamide having $[\alpha]_D^{20}=-23.2°$ (c= 4.35% in methanol); M.P. 104–105°C is obtained. In analogous manner the following products are prepared: 2,S(+)-N,N-disec.butyl-[1-(o-chlorobenzyl)-2-pyrryl]glyoxylamide; $[\alpha]_D^{20}=+23.3°C$ (c=4.35% in methanol); M.P. 104°–105°C.

R,S-N,N-disec.butyl-[1-(o-chlorobenzyl)-2-pyrryl]-glyoxylamide; M.P. 98.5°–100.5°C.

N,N-disec.butyl-[1-(o-chlorobenzyl)-2-pyrryl]glyoxylamide; M.P. 87°–89°C, prepared starting from commercial disec.butylamine formed of a mixture of the three stereoisomers.

To 29.5 g of a 70% benzenic solution of sodium bis-(-methoxy ethoxy)-aluminum hydride placed in a four necked flask of 250 ml, provided with a tube for bubbling nitrogen, reflux cooler protected with a tube filled with soda lime, stirrer, thermometer and dropping funnel, a solution of 18g of (−)N,N-di-(R, R)-sec.butyl-[1-(o-chlorobenzyl)-2-pyrryl]glyoxylamide in 40 ml of anhydrous benzine is added dropwise.

The reaction temperature is kept around 40°C by suitably adjusting the rate of addition; a time of about 50 minutes is the right time. Heating at 40°–45°C is continued for further 1½ hour and then the temperature of the reaction mixture is brought to about 0°C. Milliliters 4 of water are added continuously to decompose the excess hydride. The formed solid product is allowed to settle and the organic layer is decanted.

The solid is extracted two times with a mixture consisting of equal volumes of a 10% aqueous solution of sodium hydroxyde and benzene. The benzenic extracts are added to the previously decanted benzenic phase and are washed many times with a 10% aqueous solution of sodium hydroxyde and benzene.

The benzenic extracts are added to the previously decanted benzenic phase and are washed many times with a 10% aqueous solution of sodium hydroxyde.

All the aqueous phases are united and washed with benzene. All the benzenic phases are united, washed many times with water, dried on $MgSO_4$ and filtered.

The filtrate is evaporated under vacuum at 60°C in order to completely eliminate benzene.

The oleous residue (16.7 g) is dissolved in 20 ml of acetone and to this a solution consisting of 6.2 g of p-hydroxy benzoic acid in 25ml of acetone is added dropwise, under stirring. The precipitate formed after allowing the solution at rest over about 12 hours at 0°C is filtered under vacuum, washed on the filter with iced acetone and pentane and dried under vacuum at 50°C; a first yield of 19.6 g is thus obtained.

A second yield of 1.7 g may be obtained from the mother liquor concentrated up to one-third of the original volume and placed in a freezer. The two amounts of product are dissolved in 140 ml of boiling acetone. The solution is allowed to cool to about 35°C and then is dropped, under efficient stirring, in 500 ml of cold water. The suspension is stirred over 2 hours and then filtered. The precipitate is washed on the filter with water and then dried in air stream at 50°C; 18.5 g of 1-[1'-(o-chlorobenzyl)-2-pyrryl]-2-di-(R,R)-sec.butylamino-(1R+1S)-ethanol p-hydroxybenzoate are obtained.

The mixture of the thus obtained diastereoisomers melts with decomposition between 125° and 130°C and its specific rotatory power $[\alpha]_D^{20}$ is comprised between −9° and −11°.

The given values are true for equimolecular mixtures of 1-[1'-(o-chlorobenzyl)-2'-pyrryl]-2-di-(R,R)-sec.butylamino-(1R+1S)-ethanol, while, if during the preparation some modification occurs in the reaction conditions, such as to modify the ratio between the two isomers, the characteristics of the corresponding p-hydroxybenzoate may vary widely. One part by weight of the so prepared salts mixture is dissolved into 6 parts of boiling acetone.

By cooling at room temperature the obtained solution, keeping the same under stirring over about 1 hour and filtering, a mixture enriched of diastereoisomer $R_2$ is obtained.

Further, repeated crystallizations from acetone under the same conditions, allow the separation of the crystalline, colorless diastereoisomer $R_2$ which melts with decomposition at 136°–137°C (uncorrected) and shows a $[\alpha]_D^{16} = -18.5°$ (c=4% in methanol). On the thus obtained compound, the NMR spectrum reported in FIG. 1, has been formed.

By cautiously evaporating to dryness the mother liquor of the first crystallization, a mixture enriched of diastereoisomer $R_1$ is obtained, By repeatedly crystallizing this mixture from six parts of isopropanol, the pure diastereoisomer $R_1$ is obtained. The compound $R_1$ may be also obtained by concentrating the mother liquors up to a ratio solute:solvent equal to 1:6 and cooling for about 1 hour at room temperature, under stirring.

The solid product enriched of diastereoisomer $R_1$ is separated by filtration and crystallized many times from isopropanol or acetone; in this manner the crystalline, colourless diastereoisomer $R_1$ is obtained, melting with decomposition at 127°–129°(uncorrected) which shows an $[\alpha]_D^{20} = -1°$ (c=4% in methanol).

We claim:

1. The diastereoisomer of 1-[1'(o-chloro-benzyl)-2'-pyrryl]-2-di-(R,R)-sec.butylamino-ethanol, whose p-hydroxybenzoate has $[\alpha]_D^{16} = -24° \pm 3°$ (c=1% in methanol), and physiologically acceptable acid addition salts, essentially free of different optical isomers.

2. 1-[1'-(o-choro-benzyl)-2'-pyrryl]-2-di-(R,R)-sec.-butylamino-ethanol p-hydroxybenzoate, with $[\alpha]_D^{16} = -24° \pm 3°$ (c=1% in methanol).

3. Process for the preparation of the diastereoisomer of 1-[1'-(o-chloro-benzyl)-2'-pyrryl]-2-di-(R,R)-sec.butylaminoethanol whose p-hydroxybenzoate has $[\alpha]_D^{16} = -24° \pm 3°$ (c=1% in methanol) ($R_2$) wherein a. the R,R-(−)-disec.butylamine is prepared by reacting the R (−) sec.butylamine with a racemic sec.-butyl derivative of formula $X-CH(CH_3)C_2H_5$, Wherein X is Br, Cl, I, $SO_4$ or $p-CH_3-C_6H_4-SO_3$ in the presence of a polar organic solvent at a temperature comprised between 0°C and the boiling point of the reaction mixture, separating the optically active disec.butylamine from the R,S-disec.butylamine by fractional crystallization of the corresponding salts from a polar organic solvent, and freeing the same by treatment of the salt with a strong, inorganic base;

b. the R,R-(−)-disec.butylamine is condensed with 1-(o-chlorobenzyl)-2-pyrryl gloxyl halide in the presence of an inert organic solvent and of a hydrohalogenic acid blocking agent;

c. the (−)N,N-disec.butyl-[1-(o-chlorobenzyl)-2-pyrryl]gloxyamide is reduced to 1-[1'-(o-chlorobenzyl)-2''-pyrryl]-2-disec.butylamino (1R + 1S) ethanol by means of an alkali metal − or organo alkali metal-hydride;

d. the mixture of the two diastereoisomers is salified with p-hydroxy-benzoic acid; and e. the diastereoisomer ($R_2$) is separated by fractional crystallization from a polar organic solvent.

4. Process according to claim 3, wherein the optically active disec.butylamine is separated from the R,S-disec. butylamine in step (a) by fractional crystallization of the corresponding hydro-bromides from acetone or from an ethanol-acetone mixture.

5. Process according to claim 3, wherein the hydrohalogenic acid blocking agent of step (b) is selected from the group consisting of pyridine, trialkylamines, N,N-dialkylaniline, and alkaline − or alkaline earth acid carbonates.

6. Process according to claim 3, wherein the organo-alkali metal-hydride of step (c) is sodium-bis-(2methoxyethoxy)-aluminum hydride.

7. Process according to claim 3, wherein the fractional crystallization of step (e) is performed with boiling acetone in a ratio of 1:6.

* * * * *